(12) United States Patent
Gubeli, III et al.

(10) Patent No.: US 9,696,517 B2
(45) Date of Patent: Jul. 4, 2017

(54) INSERTION DEVICE AND METHOD FOR ACCURATE AND REPEATABLE TARGET INSERTION

(71) Applicant: JEFFERSON SCIENCE ASSOCIATES, LLC, Newport News, VA (US)

(72) Inventors: Joseph F. Gubeli, III, Gloucester, VA (US); Michelle D. Shinn, Newport News, VA (US); Michael E. Bevins, Windsor, VA (US); Lawrence Dillon-Townes, Newport News, VA (US); George R. Neil, Williamsburg, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 0 days.

(21) Appl. No.: 14/662,047

(22) Filed: Mar. 18, 2015

(65) Prior Publication Data

US 2015/0268445 A1 Sep. 24, 2015

Related U.S. Application Data

(60) Provisional application No. 61/955,339, filed on Mar. 19, 2014.

(51) Int. Cl.
G02B 7/182 (2006.01)

(52) U.S. Cl.
CPC ............ *G02B 7/1825* (2013.01); *G02B 7/182* (2013.01)

(58) Field of Classification Search
CPC .. G02B 6/4438; G02B 6/4425; G02B 6/3652; G02B 6/4219; G02B 6/4226; G02B 7/1825
USPC ..... 248/669, 545, 544; 359/201.2, 872, 878, 359/881, 871, 849
See application file for complete search history.

(56) References Cited

U.S. PATENT DOCUMENTS

| | | | | |
|---|---|---|---|---|
| 2,045,523 A * | 6/1936 | Fassler | ................... | B23K 11/31 219/234 |
| 4,425,026 A * | 1/1984 | Lien | ...................... | G02B 7/1825 359/849 |
| 4,989,965 A * | 2/1991 | Bryan | ...................... | G02B 7/00 359/871 |
| 6,009,219 A * | 12/1999 | Doyle | .................... | G02B 6/352 385/18 |
| 6,325,551 B1 * | 12/2001 | Williamson, III | ... | G02B 6/4219 385/147 |
| 6,586,957 B1 * | 7/2003 | Hunter | ................. | H01R 13/631 324/750.25 |
| 7,738,121 B2 * | 6/2010 | Spalding | .............. | G01B 11/028 250/559.24 |
| 2004/0052470 A1 * | 3/2004 | Kim | ........................ | G02B 6/30 385/52 |
| 2005/0256672 A1 * | 11/2005 | McMurtry | ............. | G01B 7/012 702/150 |

(Continued)

*Primary Examiner* — Muhammad Ijaz

(57) ABSTRACT

The present invention discloses a device and a method for inserting and positioning a target within a free electron laser, particle accelerator, or other such device that generates or utilizes a beam of energy or particles. The system includes a three-point registration mechanism that insures angular and translational accuracy and repeatability of positioning upon multiple insertions within the same structure.

3 Claims, 3 Drawing Sheets

(56) References Cited

U.S. PATENT DOCUMENTS

| | | | |
|---|---|---|---|
| 2009/0102107 A1* | 4/2009 | Kolodge | G01B 11/2425 269/13 |
| 2009/0103109 A1* | 4/2009 | Spalding | G01B 11/27 356/625 |
| 2011/0065361 A1* | 3/2011 | Schussler | B24B 13/00 451/11 |

* cited by examiner

US 9,696,517 B2

INSERTION DEVICE AND METHOD FOR ACCURATE AND REPEATABLE TARGET INSERTION

This application claims priority from U.S. Provisional Patent application No. 61/955,339 filed on Mar. 19, 2014.

The United States of America may have certain rights to this invention under Management and Operating Contract No. DE-AC05-06OR23177 from the Department of Energy.

FIELD OF THE INVENTION

The present ion relates generally to target insertion systems for beam generation devices, and d more particularly', to insertable alignment systems suitable for use with Free Electron Lasers (FEL) and similar devices.

BACKGROUND OF THE INVENTION

Devices which generate or rely upon beams, i.e. streams of particles or energy, typically incorporate elements which are used to focus, guide, or direct the beam within the device. In most cases, these elements must be properly situated and precisely aligned so as to insure the beam generation devices operate properly and at maximum efficiency. For example, oscillator-based Free Electron Lasers (FEL) require highly aligned (sub 10 µrad) optical cavity mirrors in order to insure FEL startup and for maintenance of subsequent lasing.

One of the methods currently used to align FEL mirrors is to provide an alignment laser that is coaxial to the ideal FEL path. An alignment mirror is then inserted via pneumatic air cylinder, step motor, or any such means, into position in the FEL mechanism. The alignment laser is reflected off the mirror in order to accomplish alignment. However, in order to satisfactory align the FEL on a consistent basis, the inserted alignment tools, whatever they may be, must be accurately located in exactly the same position with respect to the surrounding structure(s) for each respective insertion.

Unfortunately, conventional prior art insertion devices simply do not have the accuracy or the repeatability required to properly align the insertion target time after time. Conventional insertion devices commonly use the mechanical stops of a pneumatic cylinder and a non-rotating shaft for positioning the target. Devices that are inserted pneumatically are often positioned by the stroke of the cylinder. The difficulty is that the positioning of these devices relies on the mechanical tolerances of the equipment which does not allow for a high degree of reproducibility. In addition, under certain circumstances, such conventional devices may insert differently, i.e., in different positions, depending on the amount of air pressure applied. Finally, the prior art methods generally do not allow for any movement or adjustment of the target position once it has been inserted into a system under vacuum.

It is therefore desirable to have an insertion device and method which offers both accuracy and repeatability in vacuum and non-vacuum applications. The instant invention provides a solution to the foregoing need.

OBJECT OF THE INVENTION

It is an object of the invention to provide a beam alignment method and apparatus for accurate and repeatable target insertion in vacuum and non-vacuum applications.

It is a further object of the invention to provide a device and method which can be used to insert a target into both vacuum and non-vacuum systems with accuracy and consistency over multiple uses.

SUMMARY OF THE INVENTION

The present invention discloses a system and method for target insertion in vacuum and non-vacuum systems. The system relies upon a three-point registration system for accuracy and repeatability over the course of multiple removals and insertions of the device. The system and method can be used to align beam producing apparatus and similar devices.

In one embodiment, the system includes an insertion mechanism section, an alignment assembly, and an insertion portion. The alignment assembly includes alignment pins that register in v-grooves in order to insure that the insertion target is located in the same position relative to surrounding structures whenever the device is used for a particular application. The invention further discloses a method of using this system.

DETAILED DESCRIPTION

The present invention discloses a device and a method for inserting and positioning a target. The system includes a three-point kinematic registration mechanism that insures angular and translational accuracy and repeatability upon multiple insertions within the same structure.

Figure 1:
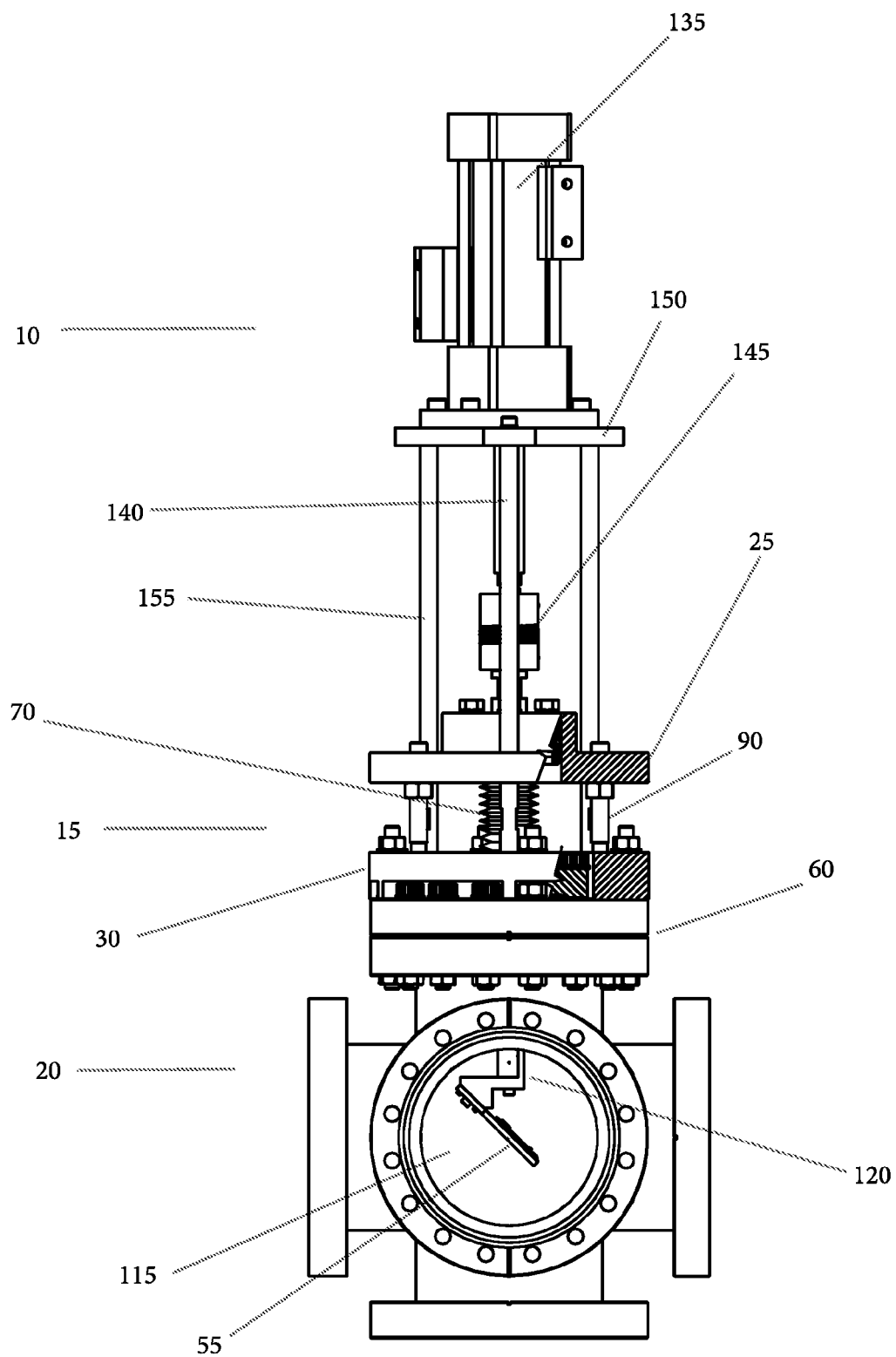
FIG. 1 is an illustration of a first embodiment of the device.
Figure 2:
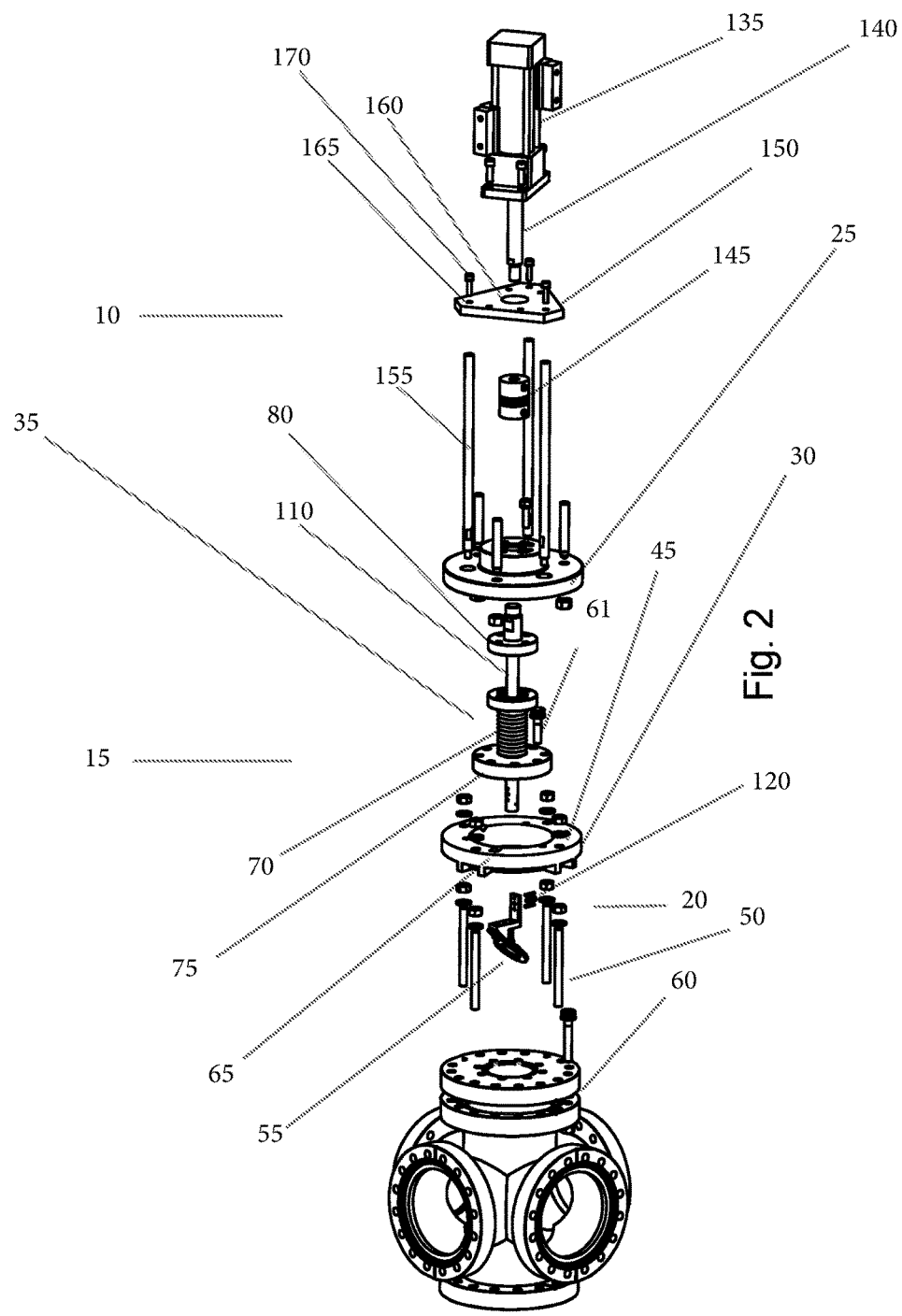
FIG. 2 is an exploded diagram of the first embodiment of the device.
Figure 3:
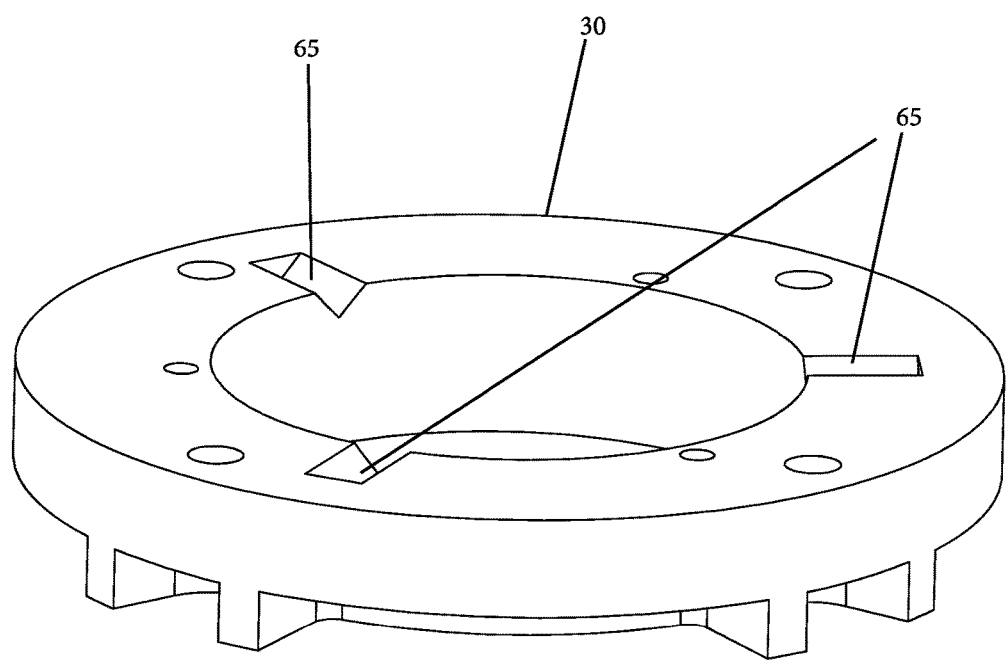
FIG. 3 is a perspective view of the alignment disk of the first embodiment.

FIGS. 1 and 2 show a first embodiment of the target insertion system according to the present invention. As seen in these figures, the system can be divided into three principal sections: an insertion mechanism section 10, an alignment assembly 15 and an insertion portion 20.

The alignment assembly 15 consists of the alignment disk 25, the alignment guide 30 a bellows arrangement 35, and the insertion element 110. The alignment guide 30 forms the floor of the alignment assembly 15 and includes a plurality of apertures 45 circumscribing its perimeter. Suitable fasteners 50, shown in FIG. 2, may be passed through one or more of these apertures 45 to secure the entire insertion device to the object into which a target 55 is being inserted. In this embodiment, the alignment guide 30 is secured to a CF flange 60. The alignment guide 30 further includes three v-groove positioning depressions 65.

The bellows arrangement 35 is mounted between alignment disk 25 and the alignment guide 30. The bellows arrangement 35 includes a flexible bellows portion 70, a lower mounting ring 75 which is affixed to the CF flange 60 via one or more fasteners 61, and an upper mounting ring 80 which is affixed to said alignment disk 25 via one or more fasteners 85. The lower-mounting ring 80 serves to maintain the vacuum seal.

The alignment assembly 15 also includes three alignment pins 90 which pass through the alignment disk 25 and are secured by fixation means 95. Each pin 90 has a first, top end 100, and a second, bottom end 105. The position of the alignment pins 90 is adjustable in relation to the upper alignment disk 25 via manipulation of the fixation means 95. Each pin 90 is aligned with a corresponding v-groove depression 65. Each respective depression 65 is disposed to receive the bottom end 105 of the corresponding pin 90 when the alignment disk 25 is lowered.

Although v-grooves are the form used in this first embodiment, the depressions 65 can be v-grooves, cylindrical pockets, or any other suitable structure which permits satisfactory registration of the alignment pins 90. The pin and the alignment guide are manufactured from hardened steel or any material having equivalent resistance to deformation. The fixation means can be a locking nut threadedly engaging each alignment pin 90 on the underside of the alignment disk 25 and rotatable relative thereto. The locking nuts and alignment pins 90 are finely threaded to permit more accurate adjustment. It will also be clear that the pins and alignment guide, including the v-grooves, must be machined with a high degree of precision.

An insertion element 110 is bolted to, welded to, or otherwise similarly secured, to the alignment disk 25 at a location which is proximate to the top, or first end, of the element 110. The insertion element 110 then passes down through the bellows 70, through an aperture in the lower mounting ring 75, through an aperture in the alignment guide 30, and ultimately into the target cavity 115, in this case a cavity within particle accelerator hardware in the form of a six way cross, An insertion frame assembly 120 is mounted at the second end 125 of the insertion element 110. While the insertion element 110 is cylindrical in the embodiments shown herein, it will be recognized that the insertion element 110 need not be cylindrical in shape so long as the appropriate connections can be made and the appropriate functions accomplished, as set forth herein.

The insertion portion 20 consists of the insertion frame assembly 120 and, in this case, a mirror target 55. It will be noted that the target 55 need not be a mirror and can be any device or object that would benefit from the insertion system herein. Further, the frame assembly 120 can be adapted or eliminated as required in order to suit the particulars of the specific target device being inserted.

A double acting pneumatic air cylinder 135 having an output shaft 140 is mechanically coupled via flexible coupling 145 to the insertion element 110. The coupling 145 allows for rotational and angular freedom of movement of the insertion element 110, when required.

The pneumatic cylinder 135 and the alignment assembly 15 are mounted on the insertion mechanism section 10 which includes an air cylinder mounting plate 150 and a plurality of support rods 155. The air cylinder 135 mounting plate 150 includes a primary aperture 160 generally centered on the mounting plate and a number of secondary apertures 165 around the perimeter of the plate. The output end of the pneumatic cylinder abuts the mounting plate and the output shaft 140 passes through the primary aperture 160. As noted above, the output shaft is then secured to the insertion element 110. The support rods 155 are secured to the mounting plate by fastening means such as socket head cap screws 170 and hex nuts 175.

The mating of the three alignment pins 90 with the respective v-grooves 65 provides a three point kinematic registration of position. In practice, the insertion device is provided along with a desired target attached to the end of the insertion element 110. The user then determines the desired position and adjusts the assembly prior to attachment to the object into which the target is being inserted. Once the assembly is affixed to the object into which the target is being inserted it is ready for operation. The air cylinder, when one is used as the actuator, can then be activated. The output shaft 140 drives the alignment disk downward, in the embodiment shown in FIGS. 1 and 2, along the support rods 155 until a three-point kinematic registration is obtained and the inserted target 55 is located in the desired position.

If further repositioning is required, one or more of the alignment pins 90 can be moved axially in relation to the alignment disk. The flexible coupling 145 allows for a certain degree of movement which is not constrained by the output shaft 140. In addition, by adjusting one or two pins, rather than all three, the stroke can be manipulated thereby tilting the insertion element 110. This adjustment is accomplished by manipulation of the fastening means which are outside the vacuum. Minor repositioning of the target 55 can therefore be accomplished while the insertion device is secured within a vacuum system without having to remove the device to make such changes.

Once calibrated and set, the insertion device, including the target 55, can be removed without the concern that it would be unable to be correctly repositioned, i.e., the target will be positioned in the same exact location on each occasion that the target is reinserted after removal.

Although the preferred embodiment using a pneumatic air cylinder is shown herein, any number of means can be used to insert the target. For instance, the device can be inserted manually using vacuum-loading to hold it in place or it can be driven in remotely, either pneumatically or with a motor. The exact insertion pressure is not critical as the ultimate position of the target is not dependent upon the insertion pressure.

The insertion device of the present invention has a high rate of repeatability and accuracy, derived from its novel, three-point kinematic registration. This design further allows the target, e.g., mirror to be precisely aligned under vacuum. The three-point kinematic registration differentiates this device from all currently available devices.

This device is not limited to the insertion of mirrors for cavity alignment, but can be used for any type of target insertion that requires angular and translational accuracy and repeatability. A target can be cooled or uncooled in a vacuum or non-vacuum system and can range from a viewer for the accurate alignment of an electron beam to a mirror that injects light into the accelerator vacuum space or extracts synchrotron/free electron laser light for diagnostics. For example, this device could be used to insert a water-cooled, high powered mirror to direct an FEL beam during operation.

While the invention has been described in reference to certain preferred embodiments, it will be readily apparent to one of ordinary skill in the art that certain modifications or variations may be made to the system without departing from the scope of the invention claimed below and described in the foregoing specification.

What is claimed is:

1. An assembly for inserting and positioning an insertion target comprising:
   a pneumatic or electric actuator having an output shaft;
   an alignment assembly; said alignment assembly comprising:
   an alignment disk having at least three apertures therein;
   a bellows portion; an alignment guide having three v-shaped grooves; and, three alignment pins, each of said alignment pins removably secured to said alignment disk and axially aligned with said respective v-shaped grooves;
   a flexible coupling;

an insertion element having a first end and a second end; said first end being mechanically coupled to said output shaft via said flexible coupling; said insertion element being secured to said alignment assembly at a location proximate to the first end of said insertion element; and, an insertion target assembly affixed to said second end of said insertion element, whereby during actuation the linear movement of said output shaft is arrested by registration of the three alignment pins in said v-shaped grooves thereby positioning said insertion target at a desired location.

2. The device of claim 1 wherein said alignment pins are composed of hardened steel and are of a shape suitable to mate with said respective v-shaped grooves.

3. The device of claim 1 wherein said pneumatic or electric actuator is a dual-acting air cylinder.

\* \* \* \* \*